United States Patent [19]
Jain et al.

[11] Patent Number: 5,601,634
[45] Date of Patent: Feb. 11, 1997

[54] PURIFICATION OF FLUIDS BY ADSORPTION

[75] Inventors: Ravi Jain, Bridgewater; Sidney S. Stern, Highland Park, both of N.J.

[73] Assignee: The BOC Group, Inc., New Providence, N.J.

[21] Appl. No.: 295,425

[22] Filed: Aug. 29, 1994

Related U.S. Application Data

[63] Continuation-in-part of Ser. No. 129,638, Sep. 30, 1993, abandoned.

[51] Int. Cl.⁶ ............................................. B01D 53/04
[52] U.S. Cl. .......................... 95/114; 95/130; 95/138; 95/148; 62/908; 62/924
[58] Field of Search ........................ 62/18, 22, 23, 62/32; 95/114, 115, 130, 138, 148

[56] References Cited

U.S. PATENT DOCUMENTS

| | | | |
|---|---|---|---|
| 2,810,454 | 10/1957 | Jones et al. | 95/138 |
| 2,893,512 | 7/1959 | Armond | 95/130 X |
| 3,140,931 | 7/1964 | McRobbie | 95/130 X |
| 3,140,932 | 7/1964 | McKee | 95/130 |
| 3,140,933 | 7/1964 | McKee | 95/130 |
| 3,150,942 | 9/1964 | Vasan | 95/115 |
| 3,355,859 | 12/1967 | Karwat | 95/114 X |
| 3,928,004 | 12/1975 | Bligh et al. | 95/114 |
| 3,996,028 | 12/1976 | Golovko et al. | 95/138 X |
| 4,239,509 | 12/1980 | Bligh et al. | 95/130 |
| 4,477,265 | 10/1984 | Kumar et al. | 95/130 X |
| 4,732,580 | 3/1988 | Jain et al. | 95/138 X |
| 4,816,237 | 3/1989 | Tomomura et al. | 95/130 X |
| 4,834,956 | 5/1989 | Agrawal et al. | 95/130 X |
| 4,861,361 | 8/1989 | Jain et al. | 95/130 X |
| 4,899,016 | 2/1990 | Clark et al. | 585/826 |
| 4,957,523 | 9/1990 | Zarate et al. | 62/13 |
| 5,039,500 | 8/1991 | Shino et al. | 423/262 |
| 5,089,034 | 2/1992 | Markovs et al. | 95/99 |
| 5,100,447 | 3/1992 | Krishnamurthy et al. | 95/130 X |
| 5,106,399 | 4/1992 | Fisher | 95/130 X |
| 5,122,165 | 6/1992 | Wang et al. | 95/92 |
| 5,125,934 | 6/1992 | Krishnamurthy et al. | 95/130 X |
| 5,159,816 | 11/1992 | Kovak et al. | 62/22 |
| 5,212,956 | 5/1993 | Tsimerman | 62/94 |

FOREIGN PATENT DOCUMENTS

| | | | |
|---|---|---|---|
| 0112640 | 7/1984 | European Pat. Off. | 95/130 |
| 2826913 | 1/1980 | Germany | 95/138 |
| 54-061092 | 5/1979 | Japan | 95/130 |
| 58-167410 | 10/1983 | Japan | 95/130 |
| 58-167411 | 10/1983 | Japan | 95/130 |
| 59-223203 | 12/1984 | Japan | 95/130 |
| 60-239310 | 11/1985 | Japan | 95/130 |
| 61-163107 | 7/1986 | Japan | 95/130 |
| 62-065913 | 3/1987 | Japan | 95/130 |
| 1-148703 | 6/1989 | Japan | 95/130 |
| 3-164410 | 7/1991 | Japan | 95/130 |
| 0267649 | 4/1970 | U.S.S.R. | |
| 1022725 | 6/1983 | U.S.S.R. | 95/138 |
| 1662641 | 7/1991 | U.S.S.R. | 95/138 |

*Primary Examiner*—Robert Spitzer
*Attorney, Agent, or Firm*—Coleman R. Reap; Larry R. Cassett

[57] ABSTRACT

High purity argon is produced by subjecting a two-phase liquid-vapor mixture containing up to 3 volume % of nitrogen and/or up to 5 volume % oxygen to cryogenic temperature swing adsorption in an adsorption bed containing one or more adsorbents selective for nitrogen and/or oxygen at a temperature between the bubble point and the dew point of the two-phase mixture.

17 Claims, 3 Drawing Sheets

5,601,634

PURIFICATION OF FLUIDS BY ADSORPTION

RELATED APPLICATION

This is a continuation-in-part of application Ser. No. 08/129,638, filed Sep. 30, 1993, now abandoned.

BACKGROUND OF THE INVENTION

This invention relates to the purification of fluids, and more particularly to the purification of a fluid by the removal of small amounts of fluid impurities from the fluid by adsorption.

The purification of fluids by the removal of small concentrations of fluid impurities can be accomplished by several physical and chemical techniques, including distillation, chemical reaction and adsorption. In some cases it is desirable to use one of these procedures while in other cases it is preferable to use another. The separation of argon from air and subsequent purification of the separated argon illustrates a case in point.

Crude argon produced by the cryogenic distillation of air by conventional techniques generally contains 1–5% by volume oxygen and up to about 1% by volume nitrogen. If it is desired to produce higher purity argon, for example argon containing less than about 10 parts per million (ppm) each of oxygen and nitrogen, the oxygen and nitrogen are removed from the argon stream by one or more of the available physical or chemical techniques. According to one technique oxygen and nitrogen are removed from the crude argon stream by further distilling the crude argon stream. This method of purification is capital intensive because the boiling points of oxygen and argon are only a few degrees apart; consequently a very high column with a large number of trays is required to reduce the oxygen content to the parts per million (ppm) range.

Another technique that has been employed is reacting the oxygen in the argon stream with excess hydrogen over a suitable catalyst at relatively high temperatures, and subsequently removing the excess hydrogen and nitrogen by cryogenic distillation. Removing oxygen by this technique requires a significant quantity of energy, however, since the gas stream must be heated to a relatively high reaction temperature and later cooled to cryogenic temperatures to distill off the excess hydrogen and the nitrogen present in the gas stream. Furthermore, the high purity hydrogen required for the oxidation is not always available at locations where it is desired to operate such argon purification plants.

Argon has been separated from nitrogen and oxygen by pressure swing adsorption (PSA) at ambient temperatures. U.S. Pat. Nos. 4,144,038 and 4,477,265 disclose adsorption of oxygen and nitrogen from an argon-rich feedstock withdrawn from the rectification column of a cryogenic air separation plant. These processes suffer from low yield and low purity of the argon product.

Recently, several cryogenic adsorption processes for the removal of both oxygen and nitrogen from argon have been developed. The removal of oxygen and nitrogen from argon at below ambient temperatures (173 to 273 K.) by PSA and a combination of PSA and temperature swing adsorption (TSA) is described in: German Patent 2,826,913 (which discloses the use of a mixture of 4A and 5A zeolites as adsorbents); Japanese Patent Kokai 59/064,510 (which uses a mixture of mordenite and faujasite as adsorbent); and Japanese Patent Kokai 58/187,775 (which uses type A zeolite as adsorbent). In the TSA embodiments of these disclosures adsorption capacities are fairly low resulting in very large bed requirements, and in the PSA embodiments high purity argon product yields are low.

The removal of oxygen alone or the removal of both oxygen and nitrogen from argon at cryogenic temperatures (90 to 173 K.) by adsorption using 4A type sieve is described in Japanese Patent Kokai 62/065,913; by Fedorov et al. in Khim. Neft. Mashinostr. (Vol 6, page 14, 1990); and by Kovalev et al. in Energomashinostroenie (Vol 10, page 21, 1987). The disadvantage of this technique is that when both nitrogen and oxygen are present in the gas stream being treated, nitrogen interferes with the adsorption of oxygen on the 4A sieve. Consequently, very large beds are required for complete oxygen removal. If nitrogen is removed by cryogenic distillation prior to adsorption, 4A zeolite sieve is effective for oxygen removal; however, this increases the cost of argon purification.

The adsorption of gases onto an adsorbent is an exothermic process. Accordingly, the temperature of an adsorbent will rise during the course of an adsorption process because of the heat given off during the adsorption. Furthermore, the quantity of heat given off is directly proportional to the concentration in the gas mixture of the component that is being adsorbed: the more gas impurity to be adsorbed from a gas mixture the greater the amount of heat given off during the adsorption step and the greater the temperature rise.

In most gas adsorption processes the adsorption efficiency is inversely proportional to the temperature at which the adsorption is conducted. The ability of an adsorbent to adsorb a given gas generally diminishes as the temperature of the adsorption bed increases. Because of this it is usually desirable to conduct the adsorption at a low temperature, and to minimize any increase in bed temperature as the adsorption proceeds.

The problem of temperature rise can be particularly acute when, for the purpose of maintaining product purity specifications it is necessary to conduct an adsorption process at just above the dew point of the gas mixture, and even a small increase in bed temperature will cause the product to fail to meet purity requirements. In such cases it is often necessary to reduce the concentration of the impurity to be adsorbed as much as possible by other techniques prior to the adsorption procedure and to apply cooling to the bed to maintain it at constant temperature during adsorption. The difficulties caused by the phenomenon of bed temperature rise during cryogenic adsorption of crude argon are dealt with in various ways, two of which are illustrated in the following patents.

U.S. Pat. No. 3,928,004, issued to Bligh et al. on Dec. 23, 1975, discloses a process for the purification of crude argon gas by passing the gas through a bed of molecular sieve at a temperature near the dew point of the argon. Before the adsorption step nitrogen is removed by distillation. After the bed is regenerated it is cooled to as close as possible to the dew point of the argon, as it is necessary to conduct the gas adsorption at such low temperatures to produce argon of the desired purity. Since the bed warms up due to the heat of adsorption, the purity of the effluent from the bed falls off as the adsorption step progresses.

U.S. Pat. No. 5,159,816, issued to Kovak et al. on Nov. 3, 1992, discloses the production of high purity argon (containing less than 5 ppm each of nitrogen and oxygen) by cryogenic adsorption by passing gaseous crude vapor argon feed first through a bed of adsorbent which preferentially adsorbs nitrogen and then through a bed of adsorbent which preferentially adsorbs oxygen. The process can be carried out without the need of refrigeration by maintaining a low gas space velocity through the beds and by limiting the content of oxygen and nitrogen in the crude vapor argon feed to the adsorption system to no more than 0.8 mole percent and 0.5 mole percent, respectively.

The temperature rise during adsorption can be significant. For example, the temperature rise experienced during the adsorption of oxygen from an argon gas stream in a bed of 4A zeolite at cryogenic temperatures is as much as 60° C. when the feed gas mixture contains up to 3.5% by volume of oxygen. Since the oxygen capacity of 4A zeolite at cryogenic temperatures diminishes rapidly as the temperature rises, vapor phase adsorption of oxygen from crude argon containing more than about 1.0% by volume oxygen in a bed of 4A zeolite is not a suitable technique when high purity argon product is sought.

Because of the importance of substantially pure argon, for instance in the electronics field, economical high efficiency and high yield processes for removing both of these impurities from an argon stream are constantly sought. The present invention provides such a process.

SUMMARY OF THE INVENTION

In a broad embodiment of the invention, a two-phase (vapor-liquid) mixture comprised of a fluid stream containing small amounts of one or more fluid impurities is purified by a temperature swing adsorption process in one or more beds of adsorbent which preferentially adsorb the impurities, the adsorption step of the process being carried out at a temperature at which the two phase system exists.

The mixture is generally comprised predominantly of the substance which it is desired to purify and contains up to about 5% by volume each of one or more impurities. In a preferred embodiment the impurities are present at a concentration up to about 3% each by volume, and in the most preferred embodiment the total concentration of impurities does not exceed about 5% by volume.

The impurities can all be removed in a single bed of adsorbent which more strongly adsorbs the impurities than the substance to be purified or in two or more beds of adsorbent, each of which adsorb one or more of the impurities more strongly than the substance to be purified.

The adsorption step is generally carried out at an absolute pressure of 0.5 to about 20 atmospheres and at temperatures between the bubble point and the dew point of the gas being purified at the selected pressure, i.e. at any temperature at which a two-phase system of the mixture exists. The adsorption step is preferably carried out at an absolute pressure of about 1 to about 10 atmospheres and at a temperature below about 0° C. and is most preferably carried out at cryogenic temperatures, particularly at temperatures below about $-100°$ C.

The adsorption process can be used to purify any gas which can be liquefied at the temperature at which it is desired to conduct the adsorption process, but is preferably applied to the purification of normally gaseous substances, i.e. substances which are gaseous at standard conditions (0° C. and 1 atmosphere absolute). The invention is most advantageously used to purify a permanent gas, i.e. a gas that cannot be condensed by pressure alone, by the removal therefrom of one or more permanent gas impurities. Included among the permanent gases are nitrogen, oxygen, carbon monoxide, methane and the noble gases, e.g. argon, helium, neon, krypton, etc.

In a specific embodiment of the invention high purity argon, i.e. argon containing no more than about 5 ppm by volume each of nitrogen and oxygen, is produced by subjecting a mixed liquid-vapor phase crude argon stream containing up to about 5% by volume of oxygen and/or up to about 3% by volume nitrogen as impurities to temperature swing adsorption in one or more beds of adsorbent which more strongly adsorb nitrogen and/or oxygen than they do argon, at absolute pressures in the range of about 1.0 to 20 atmospheres.

In one aspect of the above-described specific embodiment both nitrogen and oxygen are removed from the fluid stream and the adsorption process is carried out in two beds of adsorbent, the first bed of which comprises one or more adsorbents which preferentially adsorb nitrogen from the fluid mixture which comprises nitrogen, oxygen and argon, and the second bed of which comprises one or more adsorbents which preferentially adsorb oxygen from a substantially nitrogen-free stream comprising argon and oxygen. Preferred adsorbents for use in the first layer include calcium-exchanged type X zeolite, calcium-exchanged type A zeolite, 13X zeolite, and carbon molecular sieve (CMS). Preferred adsorbents for use in the second layer include CMS and 4A type zeolite.

The adsorption is preferably carried out in a battery of two or more adsorption beds arranged in parallel and operated out of phase, so that at least one bed is undergoing adsorption while another is undergoing regeneration.

Upon completion of the adsorption step, flow of the feed stream through the bed completing the adsorption step is terminated and the bed is regenerated by passing a warm purge gas substantially free of the impurity being removed therethrough. The purge gas preferably is at a temperature of about $-20°$ to about 250° C. The preferred purge gas is the high purity non-adsorbed product being produced during the adsorption step.

In another specific embodiment of the process of the invention an argon stream from a cryogenic fractional distillation air separation unit is distilled, preferably at a temperature of about 90° to 110° K., to produce an oxygen-enriched bottoms product stream and an argon-enriched overhead product stream. Part of the argon-enriched product stream is then subjected to a two-phase feed TSA process at cryogenic temperatures to remove residual nitrogen and oxygen from this stream, thereby producing a high purity argon product stream. The high purity argon stream, now containing not more than about 5 ppm each of nitrogen and oxygen, may be passed to product directly or condensed and passed to product as high purity liquid argon. In this embodiment the portion of the argon-enriched overhead product stream not subjected to adsorption is condensed and returned to the crude argon distillation column as reflux.

In an alternate embodiment, all of the argon-enriched overhead product is subjected to a cryogenic TSA process and all or a portion of the high purity argon nonadsorbed product stream is condensed, and all or part of the condensed argon stream is returned to the crude argon distillation unit as reflux.

In a preferred embodiment of the combined distillation-TSA process, the adsorption is conducted in a two-layer adsorbent bed of the type described above, i.e. a first layer containing one or more adsorbents which preferentially adsorb nitrogen and a second layer containing one or more adsorbents which preferentially adsorb oxygen. The preferred adsorbents for use in the first layer include calcium-exchanged type X zeolite, calcium-exchanged type A zeolite, 13X zeolite and CMS, and preferred adsorbents for use in the second layer include CMS or type 4A zeolite.

In a preferred arrangement of the system of the invention the adsorbents in the TSA system comprise a first layer of calcium exchanged X zeolite, calcium exchanged A zeolite, CMS, 13X zeolite or mixtures of two or more of these, and a second layer comprising CMS or 4A zeolite, or mixtures of these. In another preferred arrangement, the crude argon distillation column is partly or completely filled with low pressure drop structured packing. In still another preferred arrangement, the TSA system comprises a single adsorbent bed packed with an adsorbent which adsorbs nitrogen in preference to both oxygen and argon.

BRIEF DESCRIPTION OF THE DRAWINGS

The invention is illustrated in the drawings, in which.

Like characters designate like or corresponding parts throughout the several views. Auxiliary valves, lines and equipment not necessary for an understanding of the invention have been omitted from the drawings.

DETAILED DESCRIPTION OF THE INVENTION

Although the invention can be used to purify any fluid by the adsorptive removal of impurities from the fluid, it will be described in detail with the purification of a crude argon stream by the removal of nitrogen or both nitrogen and oxygen from the argon stream.

In one aspect of the invention, a mixed phase gas-liquid mixture comprising an argon stream containing nitrogen and oxygen as impurities is passed through a single-layer adsorption bed at cryogenic temperatures, thereby removing nitrogen but not substantial quantities of oxygen from the feed stream. In another aspect the mixed phase argon feed stream is passed through a two-layer adsorption bed at cryogenic temperatures, thereby removing both nitrogen and oxygen from the feed stream. The adsorption process is a TSA cycle. In a specific aspect, a feed stream consisting predominantly of oxygen and argon but also containing a small amount of nitrogen is distilled in a cryogenic distillation column to produce an argon-enriched stream by removing a significant amount of oxygen therefrom, and the argon-enriched stream is partially condensed and subjected to the above-described TSA process. In this specific aspect a portion of the high purity nonadsorbed product stream from the adsorption system may be condensed and returned to the argon distillation column as reflux. Both of these aspects are illustrated in FIG. 1.

Figure 1:
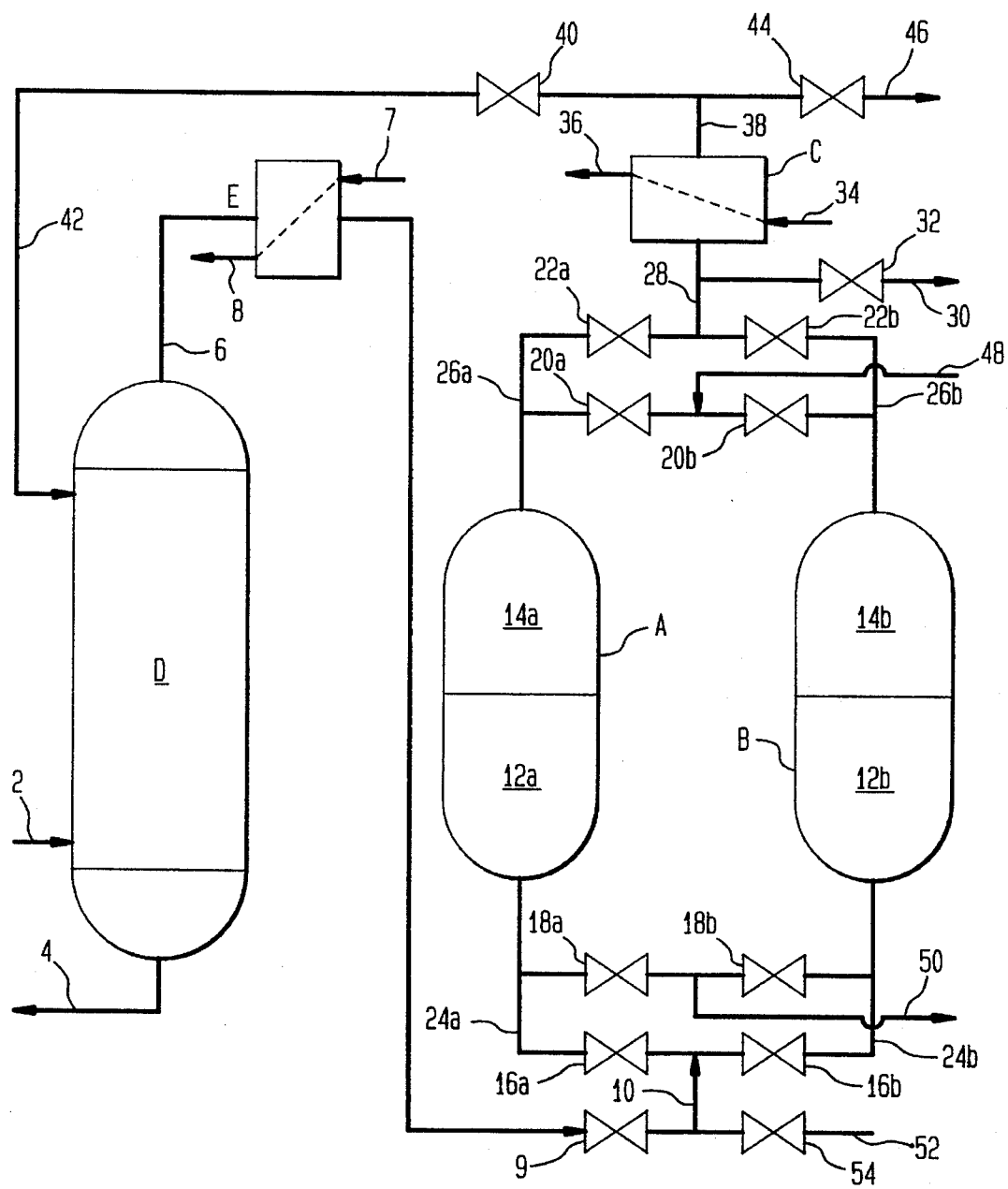
FIG. 1 depicts a system for recovering substantially pure argon from a crude argon feed in accordance with the principle of the invention in which both the gaseous feed and liquid stream are introduced into the bottom of the adsorption units.

Turning now to FIG. 1, the system illustrated therein includes a crude argon distillation column, D, a heat exchanger, E, a pair of parallel disposed adsorption beds, A and B, and a nonadsorbed product gas condenser, C. Argon-containing gas enters the system through feed line 2, which is preferably located in the lower part of column D. The feed generally enters the system at a temperature in the range of about 90° to 150° K. and an absolute pressure of about 1 to 20 atmospheres as it enters column D and is preferably at a temperature of about 90° to 110° K. and at an absolute pressure of about 1 to 3 atmospheres. Column D may contain trays, packing or both. Packed columns are preferred, however, since they offer the advantage of a smaller pressure drop. When packed columns are used, the column may be partially or completely filled with the packing. In the most preferred embodiment of the invention column D contains structured packing. The use of structured packing in column D can reduce the amount of oxygen in the crude argon effluent from column D to 0.5% or less. This can substantially reduce the load on adsorber vessels A and B, thereby reducing their size requirements substantially. The use of structured packing in crude argon columns is described in U.S. Pat. Nos. 4,994,098; 5,019,144 and 5,019,145, the specifications of which are incorporated herein by reference.

Heat exchanger E can be any cooling device which cools the gaseous crude argon exiting column D to a temperature at which the crude argon exists as a mixed phase liquid-vapor mixture at the pressure existing in line 6. Exchanger E is provided with cooling medium inlet 7 and cooling medium outlet 8.

The adsorption system illustrated in FIG. 1 is depicted as comprising two parallel arranged beds; however the invention is not limited to a two parallel arranged bed system. A single bed adsorption system can be used, but in such a case a vessel would have to be provided in line 6 to store argon enriched feed to the adsorption system during regeneration of the single bed. Similarly, the adsorption system can comprise more than two parallel arranged adsorption beds. The number of adsorption beds in the system is not critical to the operation of the invention. In the two bed system illustrated in the drawings one bed is in adsorption service while the other bed is being regenerated.

Beds A and B are identical and each contains a first layer of adsorbent, 12A and 12B and a second layer of adsorbent, 14A and 14B. The adsorbent in layers 12A and 12B preferentially adsorbs nitrogen and the adsorbent in layers 14A and 14B preferentially adsorbs oxygen from the argon feed stream. Layers 12A and 12B are generally packed with one or more adsorbents selected from X type zeolites, mordenites, CMS and A type zeolites other than type 4A zeolite, and layers 14A and 14B are generally packed with at least one adsorbent selected from CMS and 4A zeolite. Preferred adsorbents for layer 12A and 12B include calcium-exchanged type X zeolite, type 5A zeolite and 13X zeolite, and the preferred adsorbent for layers 14A and 14B is 4A. In the most efficient embodiment of the system of the invention the nitrogen adsorbent layer precedes the oxygen adsorbent layer.

In the adsorption system illustrated in FIG. 1, valves 16A and 16B control the flow of feed mixture to beds A and B, respectively; valves 18A and 18B control the flow of vent stream and desorbed stream from adsorbers A and B, respectively; valves 20A and 20B control the flow of purge gas to adsorbers A and B, respectively; and valves 22A and 22B control the flow of nonadsorbed product from adsorbers A and B, respectively.

During operation of column D oxygen-enriched liquid is withdrawn from the column through line 4, located at or near the bottom of column D, and argon-enriched vapor is withdrawn from column D through line 6, located at or near the top of the column. Argon-enriched vapor leaving column D passes through heat exchanger C wherein the vapor is cooled sufficiently by a cooling medium, such as liquid air or nitrogen from an air separation system located upstream of column D, to partially liquify this stream. The mixed phase argon stream exiting heat exchanger E passes through valve 9 and line 10.

Before the initial start-up, adsorbent beds A and B are preferably heated to temperatures up to 300° C. to remove any residual moisture contained therein. This step is not normally repeated during the regular operation.

The operation of the adsorption system will first be described with bed A in the adsorption mode and bed B in the regeneration mode. In this half of the cycle, valves 16A, 18B, 20B and 22A are open and valves 16B, 18A, 20A and 22B are closed. The two-phase feed mixture entering the system through line 10 can contain up to 3% nitrogen and about 3 to 5% oxygen. The feed mixture passes through valve 16A and line 24A and enters layer 12A of bed A. As the mixture passes through layer 12A, nitrogen is preferentially adsorbed therefrom. As the nitrogen is adsorbed the heat of adsorption will tend to increase the temperature of the adsorption bed and of the fluid stream passing through the bed. However, any increase in temperature will cause some of the liquid in the two-phase mixture to evaporate. The vaporization will, in turn, cause the temperature of the mixture (and the adsorption bed) to drop. The net result is that the heat of adsorption is offset by the heat of evaporation of the liquid in the feed mixture and the only substantial change in the system is the increase in the fraction of argon that is in the vapor phase.

The nitrogen-depleted feed stream next passes through layer 14A wherein oxygen is preferentially adsorbed from the stream. Again, as the oxygen is adsorbed the heat of adsorption will tend to increase the temperature of the adsorption bed and the fluid stream passing through the bed, thereby causing more of the liquid in the two-phase mixture to evaporate. The evaporation will again cause the temperature of the mixture (and the adsorption bed) to drop until the new equilibrium point is reached, as was the case in bed 12A, the only substantial change in the system is the further increase in the fraction of argon that is in the gaseous phase. The product stream leaving bed A, now containing no more than about 5 ppm each of nitrogen and oxygen, passes through line 26A and valve 22A and leaves the adsorption system through line 28. The product stream leaving the adsorption bed may be a superheated vapor, a saturated vapor or a two-phase stream.

A portion of the high purity argon product stream leaving the adsorption units may be removed from the system via line 30 by opening valve 32 and the remainder introduced into condenser C, or alternatively, all of the product stream may enter condenser C. The argon product is cooled sufficiently so that it is fully condensed in condenser C by means of a coolant which enters condenser C through line 34 and leaves the condenser through line 36. High purity liquid argon leaves condenser C via line 38 and is returned to the top of column D through valve 40 and line 42, where it serves as a reflux to remove oxygen from the vapor rising in column D. If desired, a portion of the high purity liquid argon can be passed to product storage by opening valve 44 in line 46. Thus, when operating the system of FIG. 1, a high purity argon product can be produced at line 30 or a high purity liquid argon product can be produced at line 46 or both products can be simultaneously produced.

While high purity argon is being produced in unit A, the beds in unit B are being regenerated. During regeneration, a warm purge gas is introduced into the unit B through line 48 and open valve 20B. The purge gas temperature is typically between −20° and 250° C. The flow of purge gas through line 48 is typically between 10 and 40% of the flow of feed stream to the adsorption system. The warm purge gas passes through bed B, thereby desorbing and sweeping oxygen and nitrogen from the bed. If the adsorption bed is contacted directly with the purge gas, it is preferred to use high purity argon as the purge gas to avoid contaminating the adsorption bed. It is however, possible to use an impure purge gas during the first part of the regeneration step. On the other hand, if the bed is indirectly contacted with the purge gas, as by passing it through heat transfer tubes embedded in the adsorbent, it is not necessary to use high purity argon as the purge gas since the purge gas will not cause contamination of the bed. In any event a final flush with pure argon and/or evacuation is usually desirable. It is also possible to provide the pure argon purge gas under vacuum conditions to reduce the purge gas usage.

The desorbed oxygen and nitrogen are removed from the adsorption section of the system through open valve 18B and line 50. This gas may be vented to the atmosphere or reintroduced into the system to recover the argon used as purge gas. This can be accomplished, for example, by introducing the desorbed gas stream into the plant feed air compressor located upstream of column D.

During the course of the adsorption step, the adsorption front in each layer of the adsorbent progresses toward the outlet end of the bed. When the front in the nitrogen adsorbing bed or the oxygen adsorbing bed, whichever is used to determine the extent of the adsorption cycle, reaches a predetermined point in the bed, the first half of the cycle is terminated and the second half is begun.

During the second half of the adsorption cycle, bed B is put into adsorption service and bed A is regenerated. During this half of the cycle valves 16B, 18A, 20A and 22B are open and valves 16A, 18B, 20B and 22A are closed. Feed stream now enters the adsorption system through line 10, and passes through bed B through valve 16B, line 24B, line 26B, valve 22B and line 28. Meanwhile bed A is now being regenerated. During regeneration of bed A, the warm purge gas passes through bed A via line 48, valve 20A, valve 18A and line 50. When the adsorption front in bed B reaches the predetermined point in this bed the second half of the cycle is terminated and the cycle is repeated.

The adsorption system of FIG. 1 can be operated independently of distillation column D by closing valves 9 and 40 and introducing the argon stream to be further purified in the adsorption system through line 52 by opening valve 54. By virtue of this feature, other argon streams such as the ones from a liquid storage station can be treated in the adsorption system of FIG. 1.

Figure 2:
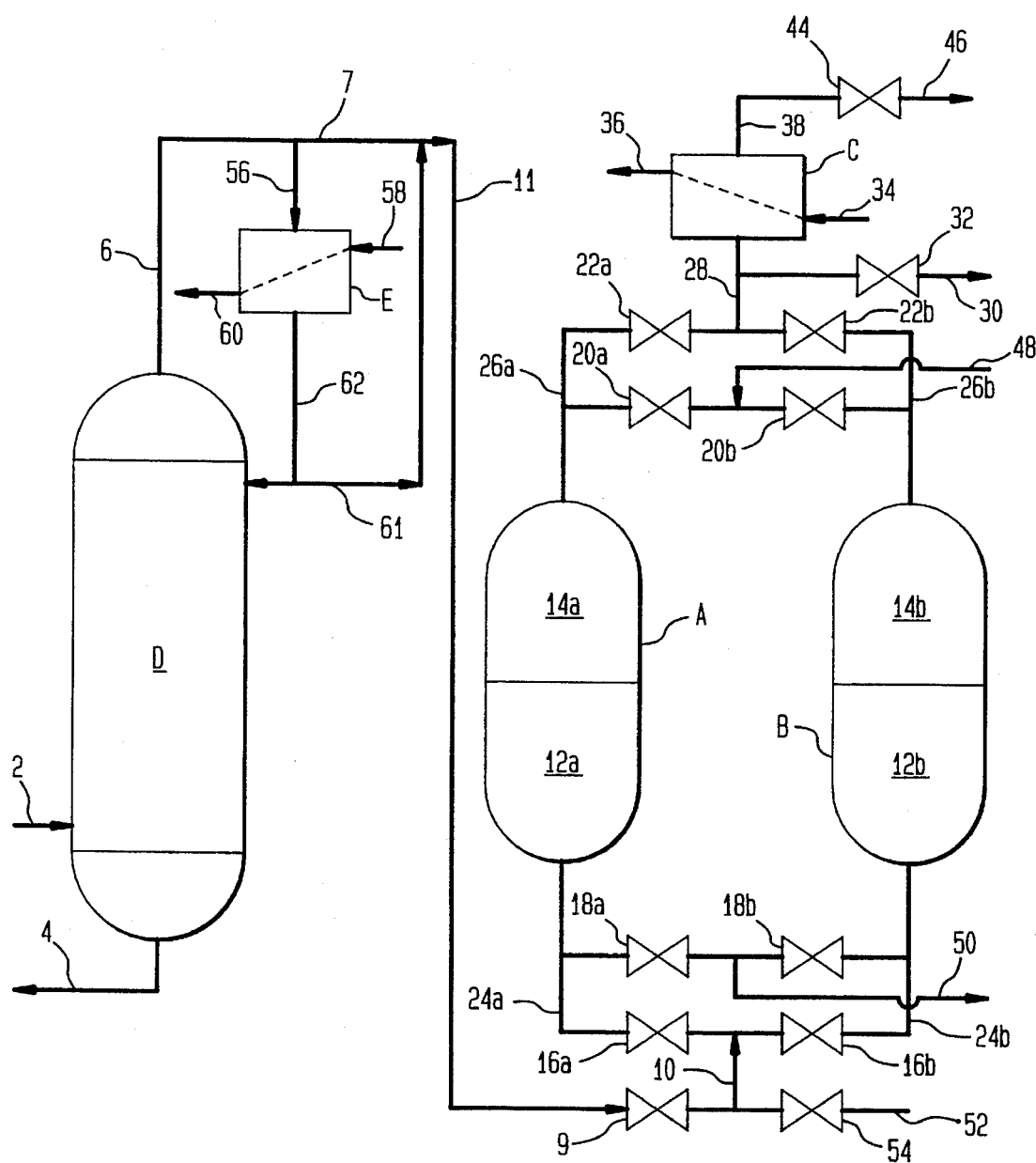
FIG. 2 illustrates a variation of the system illustrated in FIG. 1.

FIG. 2 illustrates a variation of the system illustrated in FIG. 1. With the exception of the modification of the column D reflux section, the system illustrated in FIG. 2 is identical to the system of FIG. 1. In the system of FIG. 2, a portion of the enriched-argon vapor stream leaving column D is diverted to condenser E through line 56. The mixture in line 56 is fully condensed as it passes through the condenser by means of a coolant, which enters condenser E through line 58 and leaves the condenser through line 60. Most of the condensate leaving condenser E is returned to column D via line 62. Remaining vapor stream in line 7 is mixed with part of the condensed stream in line 61 to produce a two phase mixture at line 11, which then enters the adsorption system. In this embodiment, all of the high purity argon leaving the adsorption section of the system is sent to product storage as gas, liquid or both.

Figure 3:
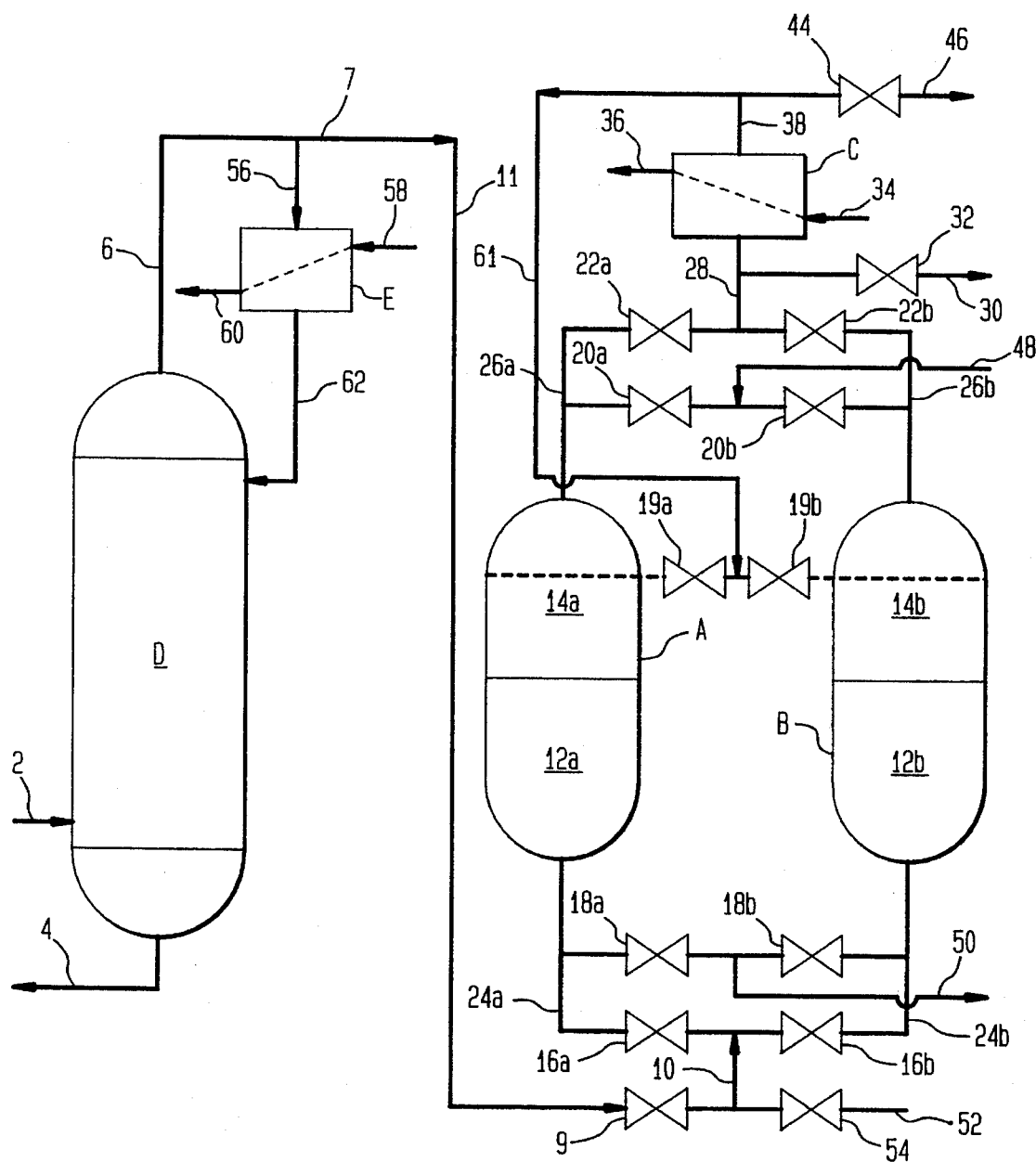
FIG. 3 illustrates an alternative embodiment in which impure gaseous feed and pure liquid product are respectively introduced into the bottom and top of the adsorbers.

The system illustrated in FIG. 3 is similar to the system of FIG. 1, except that in the system of FIG. 3, gaseous argon containing nitrogen and oxygen impurities flows upwardly through adsorbers A and B while liquid argon flows downwardly through the adsorbers, i.e. in a direction countercurrent to the flow of gaseous feed through the adsorbers. The liquid argon feed flows through line 61 and valve 19A or valve 19B, depending on which adsorber is in service. The liquid argon can enter adsorbers A and B through the top of the adsorbers and/or at some point below the top. It can be appreciated that liquid argon entering the adsorbers below the top, i.e. at some point between the top and the bottom of the adsorbers, can be pure or it can contain nitrogen and/or impurities. In the latter case the liquid argon can be liquified product from unit D.

It may sometimes be desirable to produce a product gas containing a mixture of argon and oxygen. Such gas mixtures are useful as shielding gases in welding operations. If this is desired, the adsorption system of the invention can be operated in a manner such that only nitrogen is adsorbed from the feed to the adsorption system. This can be accomplished by eliminating beds 14A and 14B and operating the adsorption system with only beds 12A and 12B. Alternatively, the entire space in vessels A and B can be filled with adsorbents in layers 12A and 12B. The system is operated in such a way that the oxygen is allowed to pass out of the beds and the cycle is terminated when the nitrogen adsorption front reaches a desired point near the nonadsorbed gas exit end of these layers. This allows production of a stream containing only argon and oxygen.

It is also possible to have a feed stream containing only oxygen as an impurity. Such a feed mixture can be produced by removing nitrogen either in distillation column D or in a separate column (not shown) downstream of column D. In this case only the adsorbent layers 14A and 14B are needed and adsorbent layers 12A and 12B can be eliminated.

A typical cycle for the adsorption process of the invention is given in Table I.

TABLE I

Typical Cycle Sequence for the Cryogenic TSA Process

| Step | Time (hrs) |
| --- | --- |
| Pressurize Bed A, purify using Bed B | 0.5 |
| Purify using Bed A, vent Bed B to atmosphere | 0.5 |
| Purify using Bed A, regenerate Bed B with warm purge gas | 4.0 |
| Purify using Bed A, cool Bed B with cold purge gas | 3.0 |
| Pressurize Bed B, purify using Bed A | 0.5 |
| Purify using Bed B, vent Bed A to atmosphere | 0.5 |
| Purify using Bed B, regenerate Bed A with warm purge gas | 4.0 |
| Purify using Bed B, cool Bed A with cold purge gas | 3.0 |
| Total | 16.0 |

The invention is further exemplified by the following examples, in which parts, percentages and ratios are on a volume basis, unless otherwise indicated. A 10.5 inch I. D. adsorption vessel 80 inches high was used in the experiments. Prior to the start of the first experiment, the zeolite adsorbents were baked to a temperature of 250° C. to remove residual moisture from the adsorbents. In all the examples the flows are stated in SCFM (standard cubic feet per minute). The standard conditions refer to a temperature of 7020 F. and a pressure of one atmosphere.

EXAMPLE I

In this example 146.5 lbs of type 4A zeolite sold by UOP was charged into the adsorption vessel and the experiment was carried out by passing a two-phase (vapor-liquid) argon feed containing 2.6% by volume oxygen upwardly through the adsorption bed. A feed flow rate of 5.6 SCFM and a feed pressure of 3 psig was maintained during the run. The oxygen concentration of the fluid passing through the bed was monitored at a height of 38 inches from the bottom of the bed using a Teledyne Liquid Cell Oxygen Analyzer. The total height of the 4A bed was 64 inches. The run was conducted for a period of 360 minutes. No oxygen breakthrough (defined as an oxygen concentration of 1.0 ppm oxygen) was detected at the sampling point during the run.

Periodic temperature measurements were made in the adsorption zone during the course of the adsorption run. At no time during the course of the run did the temperature in the adsorption zone rise above −175° C.

EXAMPLE II (COMPARATIVE)

The procedure of Example I was repeated except that the feed stream was saturated vapor. Oxygen breakthrough (1 ppm) occurred in less than 170 minutes. The run was continued until the oxygen concentration at the sampling point reached 4000 ppm. The times required for the oxygen concentration at the sampling point to reach various levels are shown in Table II.

Periodic temperature measurements made during the run revealed that the temperature in the adsorption zone rose to between −130° and −125° C. during the course of the adsorption run.

TABLE II

| Oxygen Conc. (ppm) | Time (minutes) |
| --- | --- |
| 100 | 190.0 |
| 200 | 199.2 |
| 500 | 226.0 |
| 1000 | 256.8 |
| 4000 | 276.0 |

An examination of the results obtained in Examples I and II shows that breakthrough occurs much earlier and oxygen adsorption capacity is much lower when a vapor phase mixture is used as feed instead of a two phase (vapor-liquid) mixture of the same components at the same component concentrations. The reason for this behavior appears to be the significant temperature rise that occurs during adsorption of the vapor-phase mixture.

EXAMPLE III

The procedure of Example I was repeated except that a two-phase (vapor-liquid) argon feed containing 3.7% by volume oxygen was used as feed to the test system. The adsorption run was conducted for a period of 375 minutes. During the run the temperature in the adsorption zone did not rise above −175° C. and no oxygen breakthrough (as defined above) was observed, indicating that the presence of liquid phase in the gas mixture facilitated temperature control during the run and provided high adsorption capacity.

EXAMPLE IV

The procedure of Example I was repeated except that the adsorption vessel was charged with 18 lbs of UOP CaX adsorbent and the feed comprised a two-phase (vapor-liquid) argon feed containing 0.4% by volume nitrogen. The run was conducted for a period of 6 hours. During the course of the run nitrogen concentrations were monitored at a height of 4 inches from the bottom of the bed using a Shimadzu GC-9A with a TCD detector and a Gow-Mac GC with HID (Helium Ionization Detector). The total height of the CaX layer was 8 inches. At the end of the 6 hour test period a nitrogen concentration of 23 ppm was detected at the sampling point.

EXAMPLE V (COMPARATIVE)

The procedure of Example IV was repeated except that the feed was in the form of a saturated vapor. At the end of the 6 hour run a nitrogen concentration of 645 ppm was detected at the sampling point.

A comparison of the results of Examples III and IV shows that when the feed is a two-phase vapor-liquid mixture rather than a one-phase saturated vapor mixture the nitrogen concentration in the product at the end of the 6 hour test period is considerably lower.

EXAMPLE VI

The procedure of Example I was repeated except that the adsorption vessel was charged with 18 lbs of UOP CaX, the feed was a two phase (vapor-liquid) argon stream containing 0.5% by volume oxygen, and the oxygen concentration in the stream passing through the bed was monitored at a height of 4 inches from the bottom of the bed using Teledyne Oxygen Analyzers. The times necessary for the oxygen concentration at the sampling point to reach various levels are given in Table III.

TABLE III

| Oxygen Conc. (ppm) | Breakthrough Time (minutes) |
|---|---|
| 20 | 23.6 |
| 100 | 35.4 |
| 500 | 48.0 |
| 1000 | 68.2 |
| 4000 | 215.8 |

EXAMPLE VII (COMPARATIVE)

The procedure of Example VI was repeated except that a saturated vapor was used as feed. Oxygen concentrations were monitored at a height of 4 inches from the bottom of the bed. Breakthrough times for various oxygen concentrations are given in Table IV.

TABLE IV

| Oxygen Conc. (ppm) | Time (minutes) |
|---|---|
| 20 | 9.0 |
| 100 | 17.0 |
| 500 | 26.0 |
| 1000 | 38.0 |
| 4000 | 127.4 |

Comparison of the results of Examples VI and VII indicates that much faster breakthrough occurs when a saturated vapor is used as feed rather than a two-phase vapor-liquid mixture.

It can be appreciated that the ideal fraction of liquid phase present in the feed mixture being treated by the process of the invention will depend upon the total heat that is generated in the system during the adsorption step of the process, which in turn depends upon the specific gas or gases being adsorbed, the concentration in the mixture of the gas or gases being adsorbed and the particular adsorbent(s) used in the process. In general, the heat generated during adsorption increases as the amount of the component being adsorbed increases. The temperature of the vapor-liquid mixture may vary slightly as the adsorption step proceeds since the boiling point of the mixture at any one time depends upon the boiling points of the pure components of the mixture and the concentration of each component in the mixture; and, of course, the concentration of the impurity or impurities in the mixture will gradually decrease as the adsorption step proceeds. Ideally, the fraction of the liquid phase of the substance being purified will be sufficiently great to maintain the temperature of the gas in the adsorption bed(s) substantially constant during the adsorption step of the process. By "substantially constant" with respect to the temperature of the gas in the bed(s) is meant that the temperature of the gas in the bed will not rise more than about 10° C., and preferably not more than about 5° C. during the course of the adsorption step of the process. This is not strictly necessary however, since benefit of the invention will be realized when any part of the substance being purified is in the liquid phase because the latent heat of vaporization will offset some of the heat generated during the adsorption.

Several two phase flow embodiments of the invention are contemplated. The cocurrent upflow adsorption embodiment (with impure vapor and impure liquid feed, as described in the examples, or with impure vapor feed and pure argon liquid) is the preferred mode of operation. In this mode of operation, liquid is carried vertically upward through the bed in the form of entrained mist which provides cooling effect in the adsorption zone through vaporization. If the amount of liquid entering the adsorption unit exceeds the amount that can be carried up by the vapor, the excess remains or drops back to the feed end of the adsorber, and thus has no adverse effect on product purity.

The countercurrent mode of operation, as shown in FIG. 3, (with impure vapor in the upflow mode and pure or impure argon liquid in the downflow mode) can also provide a two-phase system in the adsorption zone without contaminating the product. In this case it is important to provide good liquid distribution, to prevent channelling of the liquid along the walls of the adsorption vessel or through certain parts of the bed, and to minimize the accumulation of liquid phase at the bottom of the adsorber vessel. Since pure liquid is used in this case, any liquid entrained and carried off by the vapor product stream does not contaminate the product. In this embodiment the pure argon liquid can be introduced into the adsorption vessel at its top (the product outlet end) or at some point between the top and the bottom of the vessel.

Cocurrent downflow (with both impure vapor and impure liquid feed flowing vertically downward through the adsorption bed) is not a suitable mode of operation. In this case, the velocity of impure liquid flowing through the bed would be much greater than the velocity of liquid flow in the cocurrent upflow case. Any impure liquid that does not vaporize in the bed drops to the bottom or product outlet end of the bed, and ends up in the product as impurity. Obtaining the desired product purity (removal to ppm levels) is very difficult in this case. Likewise, the cocurrent downflow mode with impure vapor and pure liquid feed is unsuitable because, in this case, vapor-liquid equilibrium is quickly attained, with the result that the pure liquid is rapidly contaminated with impure feed.

Although the invention has been described with reference to specific examples, the scope of the invention is not limited thereto, and variations are contemplated. For example, impurities other than nitrogen and oxygen, such as hydrocarbons, can be removed from an argon stream by the process of the invention. Furthermore, fluid impurities can be removed from any fluid stream by the process of the invention. For example, nitrogen or oxygen alone can be removed from a stream comprising argon, nitrogen and oxygen, or oxygen can be removed from a nitrogen stream or nitrogen can be removed from an oxygen stream. The scope of the invention is limited only by the breadth of the appended claims.

What is claimed is:

1. A process for purifying a mixture of a specific fluid component and at least one impurity comprising subjecting said mixture to a temperature swing adsorption process having an adsorption step which comprises passing a liquid-vapor blend of said mixture or of said mixture in vapor form and substantially impurity-free specific fluid component in liquid form upwardly through at least one bed of adsorbent which adsorbs said at least one impurity more strongly than said specific fluid component, and passing purified specific fluid component out through the top of said bed of adsorbent, the temperature of said at least one bed of adsorbent at the beginning of said adsorption step being between the bubble point and the dew point of said mixture, said adsorption process being conducted under conditions such that substantially no impurity-containing specific fluid component liquid passes out through the top of said bed of adsorbent with said purified specific fluid.

2. A process for purifying a mixture of a specific fluid component and at least one impurity comprising subjecting said mixture to a temperature swing adsorption process having an adsorption step which comprises passing said mixture in vapor form upwardly through at least one bed of adsorbent which adsorbs said at least one impurity more strongly than said specific fluid component while simultaneously flowing downwardly through said at least one bed of adsorbent said specific fluid component in liquid form, and passing purified specific fluid component out through the top of said bed of adsorbent, the temperature of said at least one bed of adsorbent at the beginning of said adsorption step being between the bubble point and the dew point of said mixture, said adsorption process being conducted under conditions such that substantially no impurity-containing specific fluid component liquid passes out through the top of said bed of adsorbent.

3. A temperature swing adsorption process for purifying an argon stream which contains nitrogen as an impurity, comprising passing a liquid-vapor mixture of said argon stream or a mixture of said argon stream in vapor form and substantially pure liquid argon upwardly through a bed of nitrogen-selective adsorbent at a temperature between the bubble point and the dew point of the argon stream, and passing purified argon out through the top of said bed of adsorbent, said adsorption process being conducted under conditions such that substantially no nitrogen-containing liquid argon passes out through the top of said bed of adsorbent.

4. A temperature swing adsorption process for purifying an argon stream which contains nitrogen as an impurity, comprising passing said argon stream in vapor form upwardly through a bed of nitrogen-selective adsorbent while simultaneously passing substantially pure argon liquid downwardly through said bed of nitrogen-selective adsorbent at a temperature between the bubble point and the dew point of the argon stream, and passing purified argon out through the top of said bed of adsorbent, said adsorption process being conducted under conditions such that substantially no nitrogen-containing liquid argon passes out through the top of said bed of adsorbent.

5. A temperature swing adsorption process for purifying an argon stream which contains oxygen as an impurity, comprising passing a liquid-vapor mixture of said argon stream or a mixture of said argon stream in vapor form and substantially pure liquid argon upwardly through a bed of oxygen-selective adsorbent at a temperature between the bubble point and the dew point of the argon stream and passing purified argon out through the top of said bed of adsorbent, said adsorption process being conducted under conditions such that substantially no oxygen-containing liquid argon passes out through the top of said bed of adsorbent.

6. A temperature swing adsorption process for purifying an argon stream which contains oxygen as an impurity, comprising passing said argon stream in vapor form upwardly through a bed of oxygen-selective adsorbent while simultaneously passing substantially pure argon liquid downwardly through said bed of oxygen-selective adsorbent at a temperature between the bubble point and the dew point of the argon stream, and passing purified argon out through the top of said bed of adsorbent, said adsorption process being conducted under conditions such that substantially no oxygen-containing liquid argon passes out through the top of said bed of adsorbent.

7. A temperature swing adsorption process for purifying an argon gas-liquid mixed phase stream which contains up to about 3 volume % nitrogen and up to about 5 volume % oxygen as impurities, comprising the step of passing said argon stream, at a temperature between the bubble point and the dew point of the argon stream, first upwardly through a nitrogen-selective adsorbent and then upwardly through an oxygen-selective adsorbent, and passing purified argon out through the top of said bed of oxygen-selective adsorbent, said adsorption process being conducted under conditions such that substantially no nitrogen- or oxygen-containing liquid argon passes out through the top of said bed of oxygen-selective adsorbent.

8. The process of any one of claims 1 to 7, wherein the amount of liquid introduced into the adsorption bed is sufficient to maintain the temperature of the feed mixture substantially constant during the adsorption step.

9. The process of any one of claims 3 to 7 carried out in a plurality of adsorption beds operated out of phase with one another such that at least one bed is undergoing adsorption while at least one other bed is undergoing regeneration.

10. The process of claim 3, claim 4 or claim 7, wherein said nitrogen-selective adsorbent is selected from calcium-exchanged type A zeolite, calcium-exchanged type X zeolite, type 13X zeolite, carbon molecular sieve and mixtures of these.

11. The process of claim 5, claim 6 or claim 7, wherein said oxygen-selective adsorbent is selected from carbon molecular sieve, 4A type zeolite and mixtures of these.

12. The process of any one of claims 3 to 7, further comprising regenerating said adsorbent(s) at a temperature in the range of about −20° to 250° C.

13. The process of claim 3, claim 4 or claim 7, wherein said argon stream contains up to about 1% nitrogen.

14. The process of claim 5, claim 6 or claim 7, wherein said argon stream contains up to about 3% oxygen.

15. The process of any one of claims 2, 4 or 6, wherein said liquid argon is introduced into said bed of adsorbent at a point intermediate the top and bottom of said bed.

16. The process of claim 15, wherein said liquid argon is substantially free of nitrogen and oxygen impurities.

17. A process for producing an argon product stream containing not more than about 5 ppm each of nitrogen and oxygen from air comprising the steps of:

(a) cryogenically distilling said air, thereby producing an argon-rich stream containing not more than about 3% of nitrogen and not more than about 5% oxygen; and (b) subjecting said argon-rich stream to a temperature swing adsorption process comprising the step of adsorbing nitrogen and oxygen from said argon-rich stream by passing said argon-rich stream, at a temperature between the bubble point and the dew point of said argon-rich stream and an absolute pressure of 1 to 20 atmospheres, first upwardly through a nitrogen-selective adsorbent and then upwardly through an oxygen-selective adsorbent.

* * * * *